United States Patent [19]

Tasaka

[11] Patent Number: 5,655,056
[45] Date of Patent: Aug. 5, 1997

[54] FUZZY CONTROLLER GROUP CONTROL SYSTEM

[75] Inventor: Yoshiro Tasaka, Kyoto, Japan

[73] Assignee: Omron Corporation, Japan

[21] Appl. No.: 550,927

[22] Filed: Oct. 31, 1995

Related U.S. Application Data

[63] Continuation of Ser. No. 827,499, Jan. 30, 1992, abandoned, which is a continuation of Ser. No. 482,982, Feb. 22, 1990, abandoned.

[30] Foreign Application Priority Data

Feb. 28, 1989 [JP] Japan ........................ 1-45508

[51] Int. Cl.$^6$ ........................ G06F 9/44; G06F 15/18
[52] U.S. Cl. ........................ 395/3; 395/11; 395/61; 395/900; 364/131
[58] Field of Search ........................ 395/900, 3, 61, 395/51, 775, 800, 11; 364/184, 187, 131, 135, 148

[56] References Cited

U.S. PATENT DOCUMENTS

| | | | |
|---|---|---|---|
| 4,542,479 | 9/1985 | Kamimura et al. | 364/184 |
| 4,550,366 | 10/1985 | Toyama et al. | 364/136 |
| 4,672,529 | 6/1987 | Kupersmit | 364/139 |
| 4,689,736 | 8/1987 | Glaudel et al. | 364/140 |
| 4,751,672 | 6/1988 | Yamada | 395/775 |
| 4,760,896 | 8/1988 | Yamaguchi | 187/124 |
| 4,907,167 | 3/1990 | Skeirik | 364/139 |
| 4,910,684 | 3/1990 | Ostergaard et al. | 364/513 |
| 4,947,965 | 8/1990 | Kuzunuki et al. | 187/127 |
| 4,961,225 | 10/1990 | Hisano | 380/28 |
| 4,985,824 | 1/1991 | Husseiny et al. | 364/187 |
| 5,006,976 | 4/1991 | Jundt | 364/184 |
| 5,012,430 | 4/1991 | Sakurai | 364/513 |
| 5,051,932 | 9/1991 | Inoue et al. | 364/550 |
| 5,249,258 | 9/1993 | Hisano | 395/3 |

FOREIGN PATENT DOCUMENTS

| | | | |
|---|---|---|---|
| 59-75303 | 4/1984 | Japan | G05B 15/02 |
| 61-170802 | 8/1986 | Japan | G05B 15/00 |
| 62-143103 | 6/1987 | Japan | G05B 13/00 |

OTHER PUBLICATIONS

Procyk et al., "A Linguistic Self–Organizing Process Controller" Automatica, vol. 15, 1979, 15–30.

van Nauta Lemke et al., "Fuzzy PID Supervisor", Proc. 24th IEEE Conf. or Decision & Control, Dec. 1985, 602–608.

Larsen, P.M., "Industrial Applications of Fuzzy Logic Control", Intl. J. Man–Machine Studies, 1980, 3–10.

Yamazaki et al., "A Microprocessor Based Fuzzy Controller for Industrial Purposes", Indus. Applications of Fuzzy Control, 1985, 231–239.

Togai et al., "Expert System on a Chip: An Engine for Real–Time Approximate Reasoning", IEEE Expert, Fall 1986, pp. 55–62.

Waller, L., "Fuzzy Logic Microprocessor Tackles Real–Time Tasks", Electronic Design, Feb. 9, 1989, p. 25.

Mamdani et al., "Process Control Using Fuzzy Logic", from Fuzzy Sets—Theory and Applications to Policy Analysis and Information Systems, 1980, pp. 249–265.

Yamakawa, T., "An Approach to a Fuzzy Computer Hardware System", Proc. 2nd Intl. Conf. on Artificial Intelligence, Dec. 1986, pp. 1–22.

*Primary Examiner*—Robert W. Downs
*Attorney, Agent, or Firm*—Dickstein Shapiro Morin & Oshinsky LLP

[57] ABSTRACT

A group control system in which a plurality of fuzzy controllers are interconnected by a communication line and the parameters of rules and membership functions of each fuzzy controller are capable of being adaptively changed depending upon the state of the controlled system so as to improve the control performance of the overall system.

15 Claims, 5 Drawing Sheets

FUZZY CONTROLLER GROUP CONTROL SYSTEM

This application is a continuation of application Ser. No. 07/827,499, filed Jan. 30, 1992, now abandoned, which is a continuation application of Ser. No. 07/482,982 filed Feb. 22, 1990, now abandoned.

BACKGROUND OF THE INVENTION

This invention relates to a system provided with a a plurality of fuzzy controllers each of which receives as an input a signal representing one or a plurality of controlled variables from a controlled system, executes fuzzy inferential reasoning in accordance with predetermined rules using prescribed membership functions, and outputs a definite value as a manipulated variable regarding the controlled system.

A conventional fuzzy controller is of the stand-alone type, in which a single such controller controls a controlled system. Consequently, in a case where a control system which includes a controlled system is complicated and massive in size, control cannot be carried out by using several fuzzy controllers and operating them in cooperative fashion. Hence, a problem in the art is that only a comparatively simple, small-scale controlled system can be subjected to fuzzy control.

SUMMARY OF THE INVENTION

An object of the present invention is to provide a system in which a plurality of fuzzy controllers can be made to operate in cooperation with one another.

In order to attain the foregoing object, the present invention provides a fuzzy controller group control system characterized by comprising a plurality of fuzzy controllers and control means, wherein operating states of the fuzzy controllers are monitored by the control means and control is performed by the control means in such a manner that, in conformity with a change in the operating state of one fuzzy controller, a parameter of at least one of the other fuzzy controllers is varied.

In accordance with the present invention, a plurality of fuzzy controllers are interconnected by a communication line, the input/output state and internal processing state of each of the fuzzy controllers are monitored and judged by the control means, and the parameters of rules, membership functions, etc., of one or a plurality of the fuzzy controllers are varied adaptatively, thereby making it possible to control even a massive, complicated controlled system. With regard to altering parameters of rules, membership functions and the like, it can be arranged so that judgment and designation are performed collectively by a host computer or so that each fuzzy controller autonomously performs an exchange of data with the other fuzzy controllers.

DESCRIPTION OF THE PREFERRED EMBODIMENT

Figure 1:
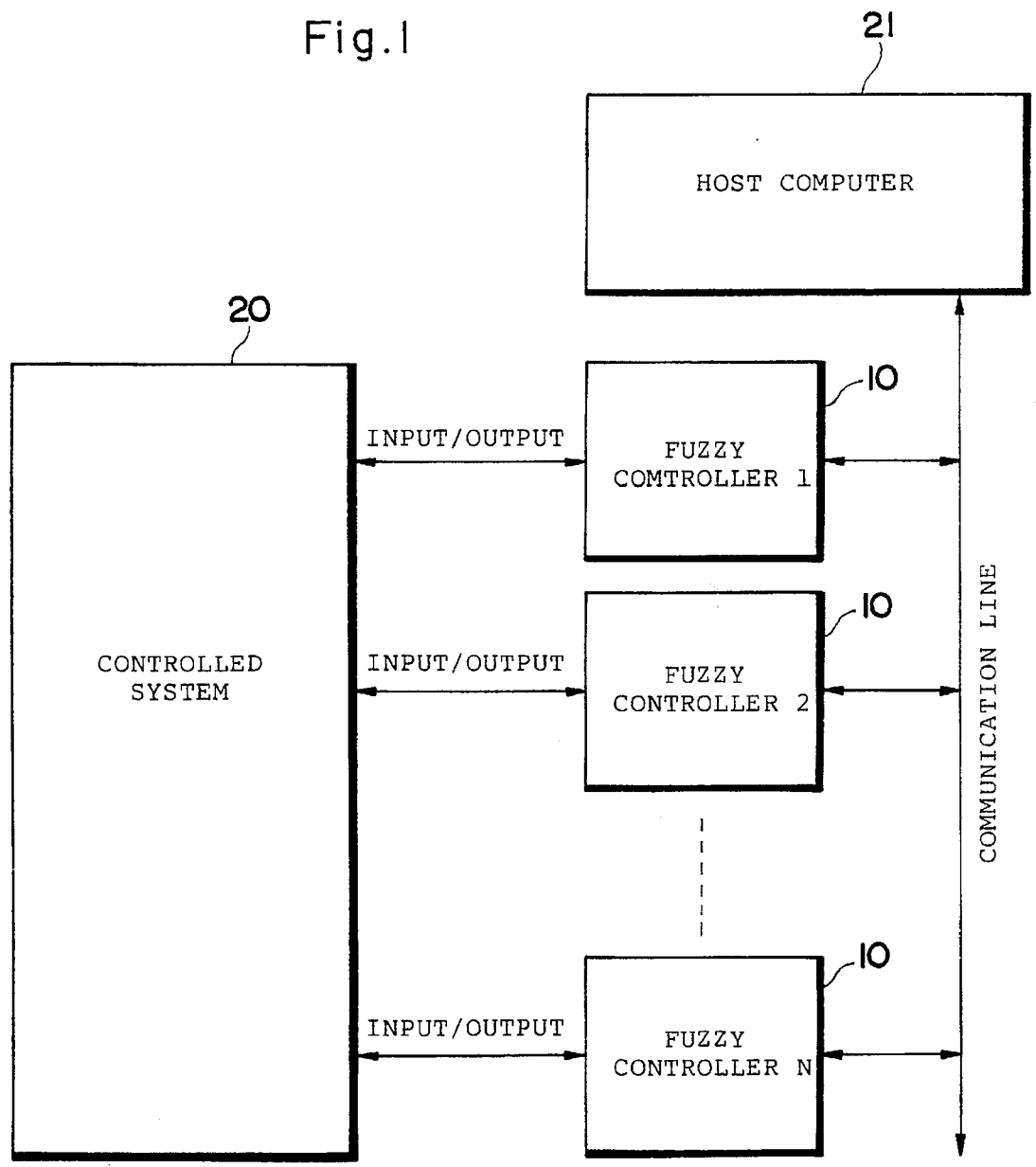
FIG. 1 is a block diagram showing the overall construction of a fuzzy controller group control system.

FIG. 1 shows an example of the construction of a group control system composed of a plurality of fuzzy controllers. Specifically, a plurality of fuzzy controllers 10 are provided in order to control a controlled system 20. Each fuzzy controller 10 receives, as an input thereto, controlled variables obtained by the controlled system, executes fuzzy inferential reasoning in accordance with predetermined rules using a prescribed membership functions regarding the controlled variables, and provides the controlled system with a manipulated variable represented by the results of the inferential reasoning. It goes without saying that the controlled variables applied to the fuzzy controllers 10 may be redundant. In other words, it can be arranged so that a controlled variable of a certain type is applied to a plurality of the fuzzy controllers. The plurality of fuzzy controllers are connected to a host computer 21 by a communication line (communication channel). With regard to the communication channel, any configuration will suffice, such as a MAP or ETHERNET, as long as it is capable of interconnecting a plurality of fuzzy controllers.

Figure 2:
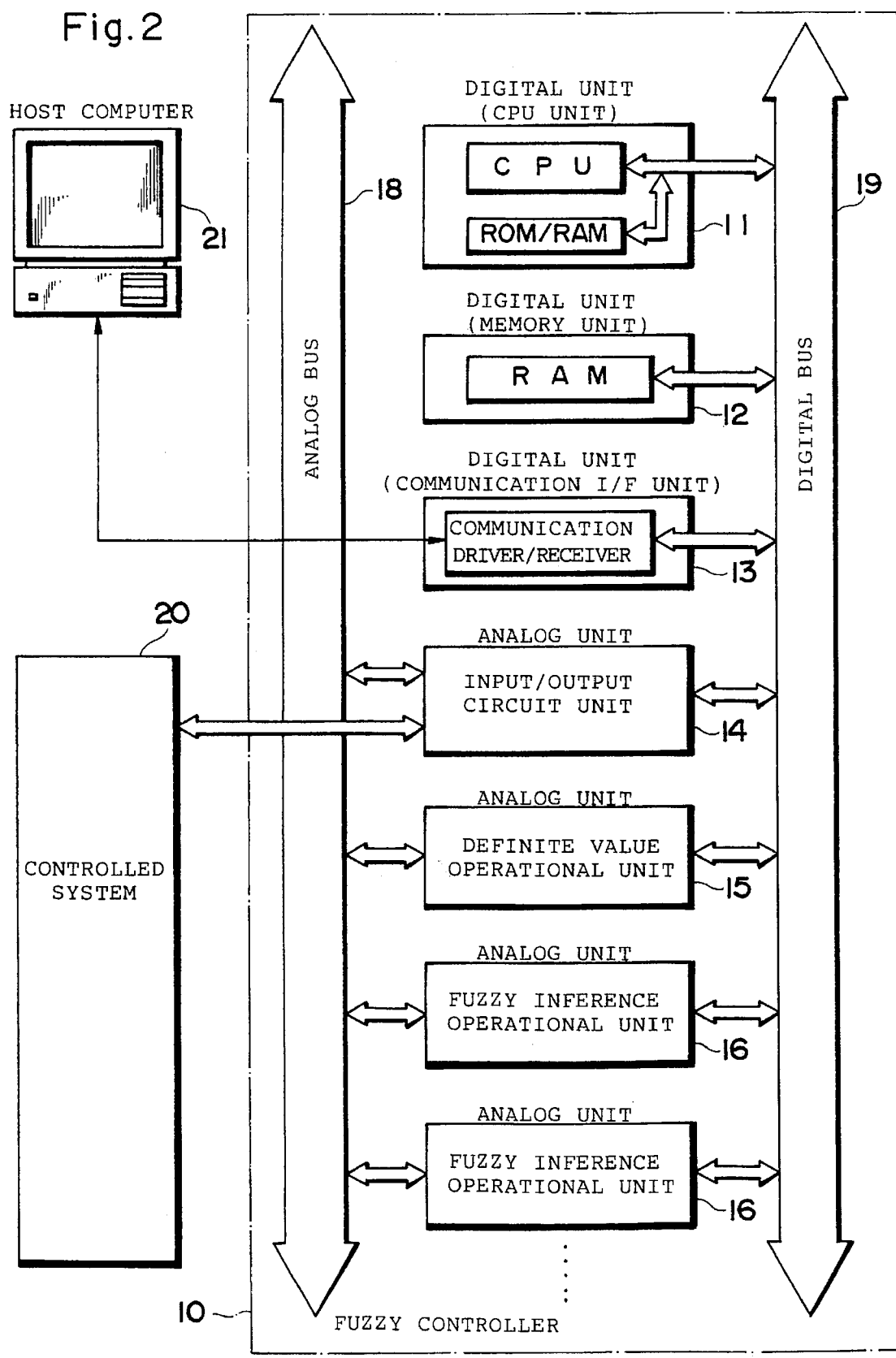
FIG. 2 is a block diagram showing an example of the construction of a fuzzy controller.

FIG. 2 illustrates a single fuzzy controller extracted from the plurality in order to illustrate an example of the construction of the fuzzy controllers 10.

The fuzzy controller 10 has three digital units 11–13 and a number of analog units 14–16. The digital unit 11 is a CPU unit and has a CPU and memories such as a ROM and RAM. The CPU unit 11 is for setting various constants and coefficients in the analog units 14–16 and for monitoring the operation of the analog units 14–16. The digital unit 12 is a memory unit and has a RAM for storing various data, byway of example. The digital unit 13 is a communication I/F unit and makes it possible for the CPU in the unit 11 to communicate with the host computer 21.

The analog unit 14 is an input/output circuit unit which acts to interface the controlled system 20 with the other analog units 15, 16. The analog unit 16 is a fuzzy inference operational unit which executes a predetermined fuzzy inferential operation based on an input of a controlled variable received from the controlled system 20 via the input/output circuit unit 14. A number of these fuzzy inference operational units 16 are provided. The analog unit 15 is a definite value operational unit for synthesizing the results of fuzzy inferential reasoning obtained from the fuzzy inference operational units 16 and determining a definite value corresponding thereto. In other words, the analog unit 15 operates as a defuzzifier. The output of the definite value from the analog unit 15 is applied as a manipulated variable to the controlled system 20 via the input/output circuit unit 14. These analog units 14–16 are interconnected by an analog bus 18. Accordingly, the number of fuzzy inference operational units 16 can be increased or decreased at will.

The analog units 14–16 are interconnected with the digital units 11–13 via the digital bus 19. As a result, various constants and the like in the analog units 14–16 are capable of being set at will by the CPU of the CPU unit 11, and the operation of the analog units 14–16 is capable of being monitored by the CPU unit 11.

The CPU unit 11 of each fuzzy controller 10 is capable of communicating with the host computer 21 and the other fuzzy controllers via the communication I/F 13. The CPU unit 11 monitors the input/output state from the input/output circuit unit 14 as well as the fuzzy operational states of the fuzzy inference operational units 16 and the definite value operational unit 15, creates data based on these monitored states, and transmits the data to the host computer 21 and to the other fuzzy controllers 10. The CPU unit 11 of each fuzzy controller 10 acts to adaptatively alter the presently prevailing rule and membership function based on the information from the other fuzzy controllers in order to improve control performance. Further, based on the data from each of the fuzzy controllers 10, the host computer 21 commands the CPU units 11 to alter the parameters of the rules and membership functions, etc., of these fuzzy controllers 10. It is possible to adopt an arrangement in which, by cooperatively controlling the plurality of fuzzy controllers, a failure in one of the fuzzy controllers can be compensated for by the other fuzzy controllers.

Figure 3:
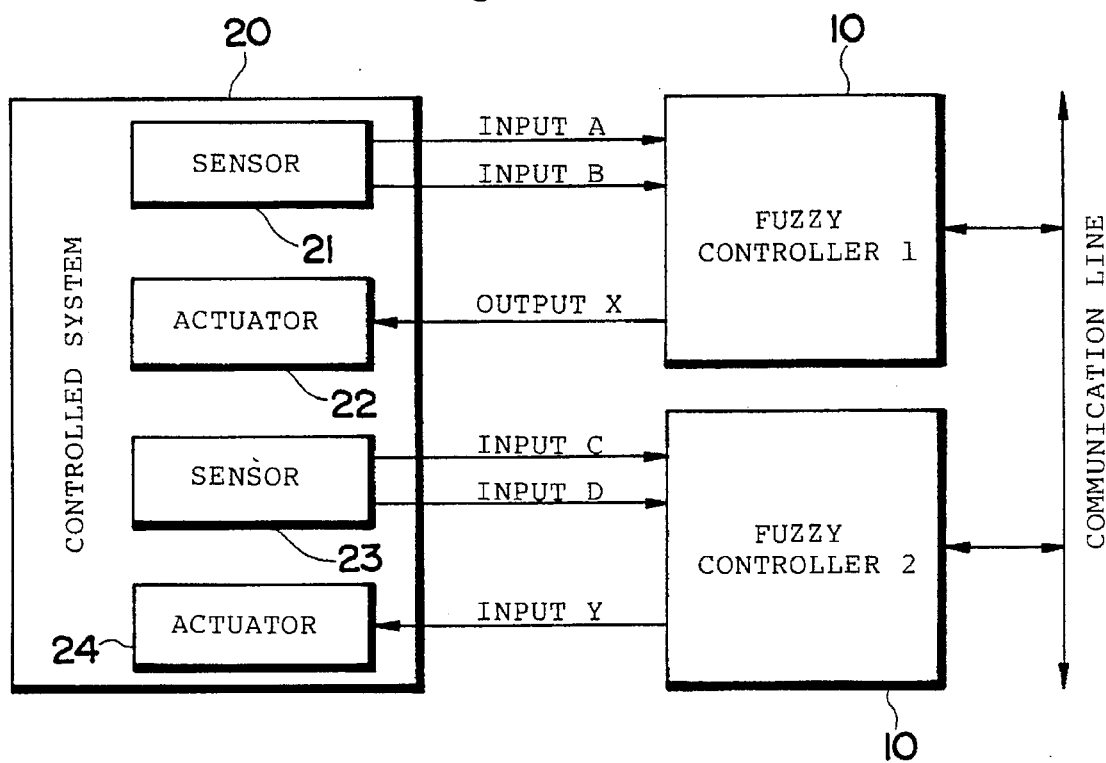
FIG. 3 is a block diagram for describing an example of control.

Though there are many examples of group control of a plurality of fuzzy controllers, the arrangement shown in FIG. 3 will be considered here as a simple example for the sake of facilitating the description.

Two fuzzy controllers 10 are provided. A sensor 21 in the controlled system 20 applies inputs A, B to a first fuzzy controller 10 (referred to as fuzzy controller 1) as controlled variables. An output X representing the inferential results from the fuzzy controller 1 is applied to an actuator 22 of the controlled system 20 as a manipulated variable. Another sensor 23 in the controlled system 20 applies inputs C, D to a second fuzzy controller 10 (referred to as fuzzy controller 2) as controlled variables. An output Y representing the inferential results from the fuzzy controller 2 is applied to an actuator 24 of the controlled system 20 as a manipulated variable.

Figure 4:
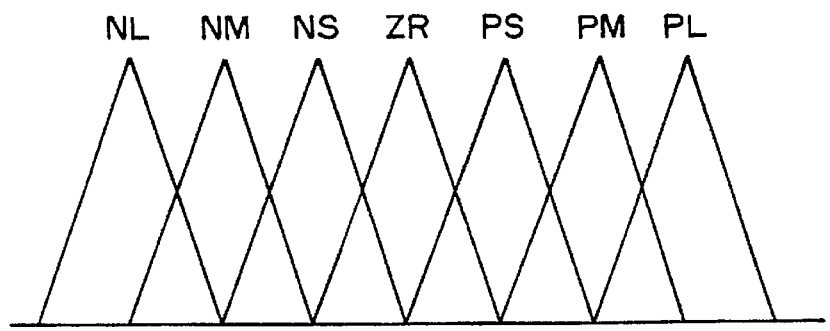
FIG. 4 is a graph showing an example of a membership function.

An example of a membership function used by these fuzzy controllers 10 is illustrated in FIG. 4, in which P, N, S, M and L represent positive, negative, small, medium and large, respectively. For example, PL represents a positive, large value and NS a negative small value. ZR expresses approximate zero.

Let the rules set in the fuzzy controller 1 be as follows, by way of example:

Rule 1: If $A = NL, B = ZR$
then $X = ZR$
Rule 2: ... ...

Let the rules set in the fuzzy controller 2 be as follows, by way of example:

Rule 1: If $C = PL, D = PM$
then $Y = NS$
Rule 2: ... ...

It will be assumed here that when the input A of fuzzy controller 1 is very large, the conclusion of Rule 1 in fuzzy controller 2 must be made Y=ZR and not Y=NS. Accordingly, the CPU unit 11 of fuzzy controller 1 monitors input A and, if A becomes a very large value, it requests the fuzzy controller 2, via the communication line, to change the conclusion of Rule 1 from NS to ZR. This processing is illustrated at steps 31 and 32 in FIG. 5. In response, the fuzzy controller 2 alters Rule 1 in accordance with the request from the fuzzy controller 1 (steps 41, 42 in FIG. 6).

Figure 5:
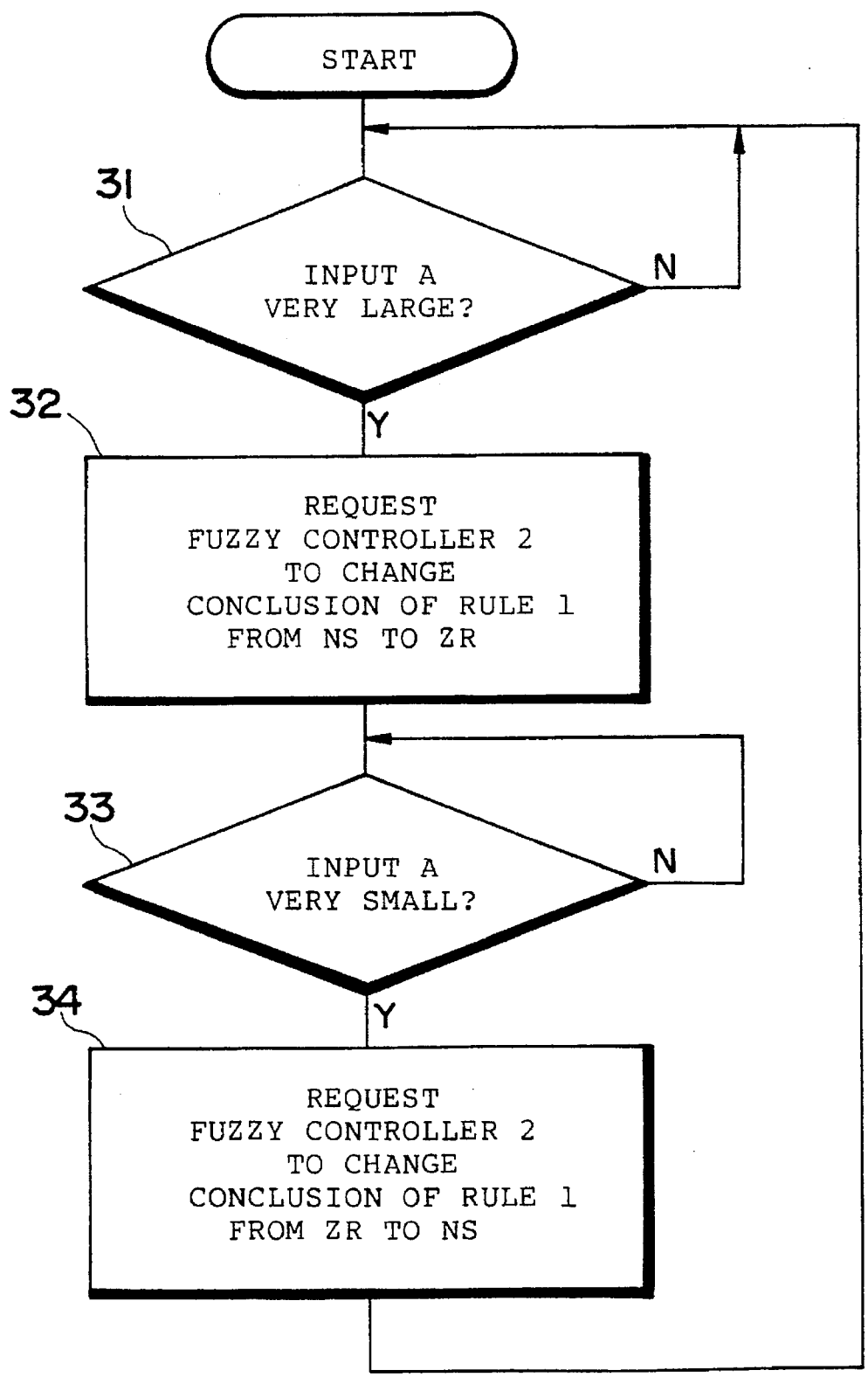
FIGS. 5 and 6 are flowcharts illustrating a control procedure.
Figure 6:
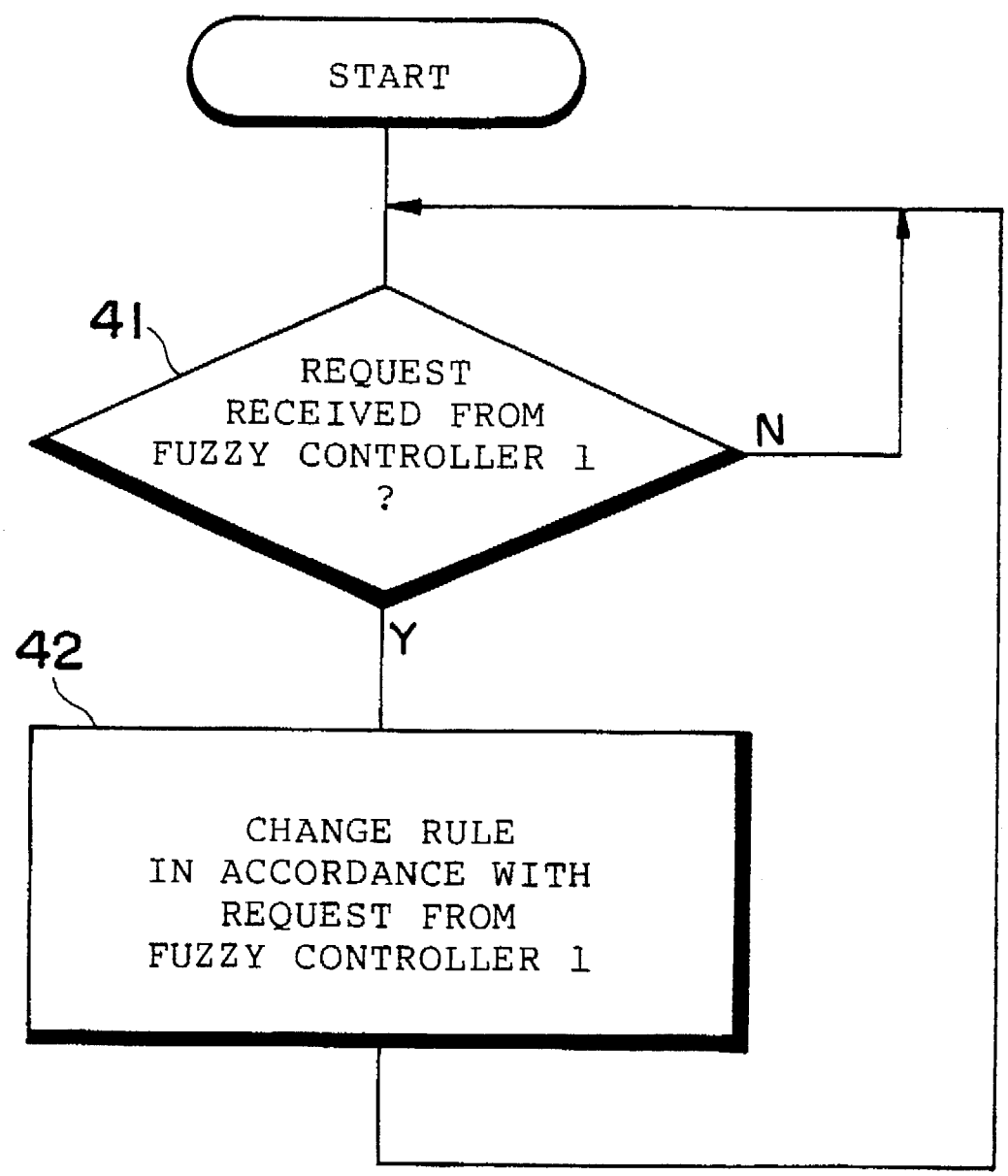

Conversely, in a case where the conclusion of Rule 1 in fuzzy controller 2 must be restored from Y=ZR to Y=NS when input A is very small, the CPU 11 of the fuzzy controller 1 monitors the input A and, if the input A becomes very small, requests the fuzzy controller 2, via the communication line, to restore the conclusion of the rule from ZR to NS, as indicated at steps 33, 34 in FIG. 5. In response, the fuzzy controller 2 alters the conclusion of Rule 1 in accordance with the request from the fuzzy controller 1 (steps 41, 42 in FIG. 6).

The foregoing processing is executed under the control of the host computer 21. Specifically, the host computer 21 monitors the change in the input A via the CPU unit 11 of the fuzzy controller 1. When the input A becomes very large, the host computer 21 requests the CPU unit 11 of the fuzzy controller 2 to change the conclusion of Rule 1 from NS to ZR.

By thus adaptatively altering the parameters of rules and membership functions via a communication line, it becomes possible to finely control a large-scale system.

As many apparently widely different embodiments of the present invention can be made without departing from the spirit and scope thereof, it is to be understood that the invention is not limited to the specific embodiments thereof except as defined in the appended claims.

What is claimed is:

1. A fuzzy controller group control system comprising:
   a plurality of fuzzy controllers for controlling a controlled system in cooperation with one another, each said fuzzy controller having control rules for performing fuzzy inference operations, the control rules including parameters capable of being varied;
   monitoring means, provided for at least one of said fuzzy controllers, for monitoring an operating state of said at least one fuzzy controller; and
   at least one control means for performing control, in response to a monitoring result by said monitoring means indicating a considerable change in the operating state of said at least one fuzzy controller, in such a manner that, in conformity with said change, a parameter relating to a fuzzy inference operation of at least one of the other fuzzy controllers is varied so as to adaptively control the controlled system.

2. The group control system according to claim 1, wherein said plurality of fuzzy controllers are interconnected by a communication line.

3. The group control system according to claim 1, wherein said at least one control means is a host computer, said host computer being connected to said plurality of fuzzy controllers so as to be capable of communicating therewith.

4. The group control system according to claim 3, wherein said plurality of fuzzy controllers communicate their respective operating states to said host computer.

5. The group control system according to claim 3, wherein said operating state includes the value of an input variable.

6. The group control system according to claim 1, wherein said plurality of fuzzy controllers are interconnected by a communication line and each fuzzy controller includes one of said at least one control means.

7. The group control system according to claim 6, wherein said control means in one of said fuzzy controllers communicates said parameter to vary to at least one other of said fuzzy controllers.

8. The group control system according to claim 1, wherein said operating states include a value of at least one input variable.

9. A fuzzy controller group control system as in claim 1, wherein a said monitoring means is respectively provided for each of said plurality of fuzzy controllers, and said control means in response to a monitoring result of a said monitoring means indicating a considerable change in the operating states of its associated fuzzy controller varies, in conformity with said change, a parameter relating to a fuzzy inference operation of at least one of the other fuzzy controllers to adaptively control the controlled system.

10. A method for operating a fuzzy controller group control system, including a plurality of fuzzy controllers, comprising the steps of:

monitoring operating states of said fuzzy controllers; and varying a parameter relating to fuzzy inference operation of at least one of said fuzzy controllers in conformity with a change in the operating state of another one of said fuzzy controllers, so as to adaptively control the controlled system.

11. The method of claim 10 wherein each of said fuzzy controllers transmits a signal indicative of the operating state corresponding to said fuzzy controller to a host computer.

12. The method of claim 10 wherein said operating state includes the magnitude of at least one input to a said fuzzy controller.

13. A group control system of controllers comprising a plurality of controllers and at least one control means;

each said controller including a digital bus, an analog bus, a digital processing unit connected to the digital bus, and an analog processing unit connected to the digital bus and the analog bus;

said control means communicating with each of said digital processing units via the digital bus;

said control means monitoring at least one operating state of each of said plurality of controllers as transmitted by the digital processing units of said controllers, and giving, when the operating state of one of said controllers satisfies a predetermined condition, an instruction corresponding to the satisfied condition to the digital processing units of at least one of the other controllers;

each said analog processing unit receiving an input of a controlled variable from a controlled subject via the analog bus and producing a manipulated variable to be fed over said analog bus to the controlled subject on the basis of the received input; and each said digital processing unit transmitting the operating state of said analog processing unit to said control means and adjusting a control parameter of said analog processing unit in accordance with the instruction from said control means.

14. A group control system of controllers comprising a plurality of controllers and a communication line connecting said controllers, each controller including:

transmitting means for transmitting an instruction corresponding to a satisfied condition to at least one of the other controllers when an operating state of said controller satisfies a predetermined condition; and changing means for changing a control parameter upon receiving an instruction transmitted from at least one of the other controllers.

15. A group control system of controllers comprising a plurality of controllers and a communication line connecting said controllers, each controller including:

transmitting means for transmitting an instruction corresponding to a satisfied condition to at least one of the other controllers when an operating state of said controller satisfies a predetermined condition; and changing means for changing a control parameter upon receiving an instruction transmitted from at least one of the other controllers; wherein each said controller includes a digital bus, an analog bus, a digital processing unit connected to said digital bus, and an analog processing unit connected to said digital bus and said analog bus;

each said analog processing unit receives an input of a controlled variable from a controlled subject via the analog bus, and produces a manipulated variable to be transmitted to the controlled subject via the analog bus on the basis of the received input; and each said digital processing unit serves as said transmitting means and said changing means, notifies at least one other controller of an operating state of said analog processing unit, and changes the control parameter of said analog processing unit in accordance with instructions from at least one other controller.

* * * * *